US012711588B2

(12) United States Patent
Asayama

(10) Patent No.: US 12,711,588 B2
(45) Date of Patent: Aug. 18, 2026

(54) LEARNING APPARATUS, MOVING IMAGE GENERATING APPARATUS, METHOD OF GENERATING LEARNED MODEL, MOVING IMAGE GENERATING METHOD, AND PROGRAM

(71) Applicant: Sony Interactive Entertainment Inc., Tokyo (JP)

(72) Inventor: Hirotaka Asayama, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 397 days.

(21) Appl. No.: 18/264,120

(22) PCT Filed: Feb. 15, 2021

(86) PCT No.: PCT/JP2021/005523
§ 371 (c)(1),
(2) Date: Aug. 3, 2023

(87) PCT Pub. No.: WO2022/172449
PCT Pub. Date: Aug. 18, 2022

(65) Prior Publication Data
US 2024/0037720 A1 Feb. 1, 2024

(51) Int. Cl.
*G06T 5/92* (2024.01)
*G06T 5/50* (2006.01)

(52) U.S. Cl.
CPC .................. *G06T 5/92* (2024.01); *G06T 5/50* (2013.01); *G06T 2207/10016* (2013.01);
(Continued)

(58) Field of Classification Search
CPC . G06T 2207/20208; G06T 2207/20081; G06T 5/92; G06T 5/60;
(Continued)

(56) References Cited

U.S. PATENT DOCUMENTS 9,098,906 B2 8/2015 Bruls et al.
10,701,404 B2 6/2020 Song
(Continued)

FOREIGN PATENT DOCUMENTS

JP 2013539610 A 10/2013
JP 2019530309 A 10/2019
(Continued)

OTHER PUBLICATIONS

International Search Report for corresponding PCT Application No. PCT/JP2021/005523, 4 pages, dated Apr. 27, 2021.
(Continued)

*Primary Examiner* — Emily C Terrell
(74) *Attorney, Agent, or Firm* — Kilpatrick Townsend & Stockton LLP

(57) ABSTRACT

A learning apparatus, a method of generating a learned model, and a program are capable of adequately widening the dynamic ranges of various images in a unified fashion. A training data generating section generates, on the basis of a second-class image, a first-class image associated with the second-class image, by referring to associative data where luminance values in a second dynamic range and luminance values in a first dynamic range are associated with each other. A learning section performs a learning process of a machine learning model by using the first-class image and the second-class image associated with the first-class image.

20 Claims, 12 Drawing Sheets

(52) U.S. Cl.
CPC ............... *G06T 2207/20081* (2013.01); *G06T 2207/20084* (2013.01); *G06T 2207/20208* (2013.01)

(58) Field of Classification Search
CPC . G06T 2207/10016; G06T 2207/20084; G06T 5/90; H04N 19/98; H04N 19/186; H04N 19/117; H04N 19/172; G06N 20/00
See application file for complete search history.

(56) References Cited

U.S. PATENT DOCUMENTS

| | | | | |
|---|---|---|---|---|
| 11,288,781 | B2 | 3/2022 | Gadgil | |
| 11,410,343 | B2 | 8/2022 | Urabe | |
| 11,625,816 | B2 | 4/2023 | Asayama | |
| 2013/0107956 | A1 | 5/2013 | Bruls et al. | |
| 2013/0108183 | A1 | 5/2013 | Bruls et al. | |
| 2019/0222866 | A1 | 7/2019 | Song | |
| 2020/0302659 | A1 | 9/2020 | Urabe | |
| 2021/0125317 | A1 | 4/2021 | Asayama | |
| 2021/0150680 | A1 | 5/2021 | Gadgil | |
| 2022/0058783 | A1* | 2/2022 | Kadu | H04N 19/172 |
| 2022/0084170 | A1* | 3/2022 | Aydin | G06N 3/092 |
| 2022/0198622 | A1* | 6/2022 | Kumar | G06N 3/0464 |
| 2024/0095893 | A1* | 3/2024 | Su | H04N 19/98 |

FOREIGN PATENT DOCUMENTS

| | | | |
|---|---|---|---|
| JP | 2020017079 | A | 1/2020 |
| JP | 2020524446 | A | 8/2020 |
| JP | 2020154609 | A | 9/2020 |
| WO | 2019239462 | A1 | 12/2019 |

OTHER PUBLICATIONS

Gabriel Eilersten, et al., "HDR Image Reconstruction from a Single Exposure Using Deep CNN's" ACM Transactions on Graphics, vol. 36, No. 6, Article 78, 15 pages, URL: Https://arxiv.org/abs/a710.07480> dated Oct. 20, 2017 (For relevancy see instant specification).

Notice of Reasons for Refusal for corresponding JP application No. 2022-581151, 6 pages, dated Jan. 27, 2025.

"Examination on the Generation of HDR Image from the SDR Image Using a Deep Neural Networks", Technical Research Report of the Institute of Electronics, Information and Communication Engineers, Japan Institute of Electronics, vol. 116, No. 496, 6 pages, Jan. 2, 2015.

* cited by examiner

LEARNING APPARATUS, MOVING IMAGE GENERATING APPARATUS, METHOD OF GENERATING LEARNED MODEL, MOVING IMAGE GENERATING METHOD, AND PROGRAM

TECHNICAL FIELD

The present invention relates to a learning apparatus, a moving image generating apparatus, a method of generating a learned model, a moving image generating method, and a program.

BACKGROUND ART

In recent years, it has been practiced to generate moving images of a high dynamic range (HDR) by widening the dynamic range of moving images in a standard dynamic range (SDR) from video resources in the past.

NPL 1 discloses a technology, which is relevant to the above practice, for generating images of the HDR from images of the SDR by widening the dynamic range of the images of the SDR with use of a convolutional neural network (CNN) that has already learned. Note that, in NPL 1, the SDR is referred to as an LDR (low dynamic range).

According to the technology disclosed in NPL 1, an image of the SDR where the luminance values of 5 percent of the pixels are of a saturated level is generated from an existing image of the HDR. Then, the learning process of the CNN is carried out in order to reconstruct the original image of the HDR from the generated image of the SDR.

CITATION LIST

Non Patent Literature

[NPL 1] Gabriel Eilertsen and three others, “HDR image reconstruction from a single exposure using deep CNNs,” [online], Oct. 20, 2017, ACM Transactions on Graphics, Vol. 36, No. 6, Article 178, [retrieved Feb. 1, 2021], Internet <URL: https://arxiv.org/abs/1710.07480>

SUMMARY

Technical Problems

According to the technology disclosed in NPL 1, images of the SDR where the luminance values of 5 percent of the pixels are of a saturated level are generated uniformly from images of the HDR no matter what scenes are represented by the images, as described above. However, real images of the SDR have various proportions of pixels whose luminance values are saturated. Therefore, the CNN that has learned such images of the SDR is unable to adequately widen the dynamic ranges of various real images of the SDR in a unified fashion.

Further, since the technology disclosed in NPL 1 does not aim at handling moving images, if the technology disclosed in NPL 1 is used on moving images, generated HDR moving images may have their temporal consistency lowered.

Now, the temporal consistency of generated HDR moving images can be increased when each frame image is generated, with use of a recurrent neural network (RNN), on the basis of the frame image of a frame that is immediately before it and that has already been generated. In this case, however, the dynamic range cannot adequately be widened because there exists no frame image of a frame immediately before the frame image of a first frame.

The present invention has been devised in view of the circumstances described above. It is an object of the present invention to provide a learning apparatus, a method of generating a learned model, and a program that are capable of adequately widening the dynamic ranges of various images in a unified fashion.

Further, another object of the present invention is to provide a moving image generating apparatus, a moving image generating method, and a program that are capable of adequately widening the dynamic range of moving images while maintaining the temporal consistency of generated moving images.

Solution to Problems

To solve the above problems, a learning apparatus according to the present invention is a learning apparatus for performing a learning process of a machine learning model that, in response to a first-class image as an image of a first dynamic range being input thereto, outputs a second-class image as an image of a second dynamic range into which the dynamic range of the first-class image has been widened, the learning apparatus including an image generating section that, on the basis of a second-class image, generates a first-class image associated with the second-class image, by referring to associative data where luminance values in the second dynamic range and luminance values in the first dynamic range are associated with each other, and a learning section that performs the learning process of the machine learning model by using the first-class image and the second-class image associated with the first-class image.

According to an aspect of the present invention, the associative data is data where luminance values equal to or higher than a predetermined value in the second dynamic range are associated with a saturated value in the first dynamic range.

Further, according to the aspect of the present invention, the associative data is a lookup table.

Moreover, the associative data may be a one-dimensional lookup table.

In addition, according to the aspect of the present invention, the first dynamic range is an SDR, and the second dynamic range is an HDR.

Furthermore, a moving image generating apparatus according to the present invention is a moving image generating apparatus that, by using a learned model and on the basis of a first-class moving image as a moving image of a first dynamic range, generates a second-class moving image as a moving image of a second dynamic range into which the dynamic range of the first-class moving image has been widened. The learned model is a learned model that, on the basis of a first-class frame image as a frame image included in the first-class moving image and a second-class frame image as a frame image of the second dynamic range of a frame adjacent to the first-class frame image, generates a second-class frame image associated with the first-class frame image. The moving image generating apparatus includes a forward generation process executing section that, by using the learned model and on the basis of a first-class frame image and a second-class frame image of a frame immediately before the first-class frame image, the second-class frame image being generated by the learned model, executes a forward generation process that generates a second-class frame image associated with the first-class frame image, a backward generation process executing section that, by using the learned model, with respect to the first-class frame image of at least a first frame, and on the basis of a first-class frame image and a second-class frame image of a frame immediately after the first-class frame image, the second-class frame image being generated by the learned model, executes a backward generation process that generates a second-class frame image associated with the first-class frame image, and a moving image generating section that generates the second-class moving image on the basis of the second-class frame image generated by the forward generation process and the second-class frame image generated by the backward generation process.

According to an aspect of the present invention, the learned model is a learned model that, on the basis of a first-class frame image, a first-class frame image of a frame adjacent to the first-class frame image, and a second-class frame image of the adjacent frame, generates a second-class frame image associated with the first-class frame image, the forward generation process executing section generates, on the basis of a first-class frame image, a first-class frame image of a frame immediately before the first-class frame image, and a second-class frame image of the frame immediately before the first-class frame image, the second-class frame image being generated by the learned model, a second-class frame image associated with the first-class frame image, and the backward generation process executing section generates, on the basis of a first-class frame image, a first-class frame image of a frame immediately after the first-class frame image, and a second-class frame image of the frame immediately after the first-class frame image, the second-class frame image being generated by the learned model, a second-class frame image associated with the first-class frame image.

Further, according to the aspect of the present invention, the backward generation process executing section generates, on the basis of a first-class frame image and a second-class frame image of a frame immediately after the first-class frame image, the second-class frame image being generated by the forward generation process, a second-class frame image associated with the first-class frame image.

Alternatively, the backward generation process executing section generates, on the basis of a first-class frame image and a second-class frame image of a frame immediately after the first-class frame image, the second-class frame image being generated by the backward generation process, a second-class frame image associated with the first-class frame image.

Further, according to the aspect of the present invention, the moving image generating section generates a second-class moving image including a second-class frame image of a first frame, the second-class frame image being generated by the backward generation process, and second-class frame images of second and subsequent frames, the second-class frame images being generated by the forward generation process.

Alternatively, the moving image generating section generates, with respect to at least one frame and on the basis of a second-class frame image of the frame, the second-class frame image being generated by the forward generation process, and a second-class frame image of the frame, the second-class frame image being generated by the backward generation process, generates a frame image of the frame included in the second-class moving image.

According to this aspect, the moving image generating section may generate, with respect to at least one frame, the second-class moving image where a weighted mean of luminance values of pixels included in the second-class frame image of the frame, the second-class frame image being generated by the forward generation process, and luminance values of the pixels included in the second-class frame image of the frame, the second-class frame image being generated by the backward generation process, is set to luminance values of the pixels included in the frame image of the frame.

Further, according to the aspect of the present invention, the first dynamic range is an SDR, and the second dynamic range is an HDR.

Moreover, a method of generating a learned model according to the present invention is a method of generating a learned model for performing a learning process of a machine learning model that, in response to a first-class image as an image of a first dynamic range being input thereto, outputs a second-class image as an image of a second dynamic range into which the dynamic range of the first-class image has been widened, the method including a step of, on the basis of a second-class image, generating a first-class image associated with the second-class image, by referring to associative data where luminance values in the second dynamic range and luminance values in the first dynamic range are associated with each other, and a step of performing the learning process of the machine learning model by using the first-class image and the second-class image associated with the first-class image.

In addition, a moving image generating method according to the present invention is a moving image generating method of, by using a learned model and on the basis of a first-class moving image as a moving image of a first dynamic range, generating a second-class moving image as a moving image of a second dynamic range into which the dynamic range of the first-class moving image has been widened. The learned model is a learned model that, on the basis of a first-class frame image as a frame image included in the first-class moving image and a second-class frame image as a frame image of the second dynamic range of a frame adjacent to the first-class frame image, generates a second-class frame image associated with the first-class frame image. The moving image generating method includes a step of executing a forward generation process that, by using the learned model and on the basis of a first-class frame image and a second-class frame image of a frame immediately before the first-class frame image, the second-class frame image being generated by the learned model, generates a second-class frame image associated with the first-class frame image, a step of executing a backward generation process that, by using the learned model, with respect to the first-class frame image of at least a first frame, and on the basis of a first-class frame image and a second-class frame image of a frame immediately after the first-class frame image, the second-class frame image being generated by the learned model, generates a second-class frame image associated with the first-class frame image, and a step of generating the second-class moving image on the basis of the second-class frame image generated by the forward generation process and the second-class frame image generated by the backward generation process.

Further, a program according to the present invention is a program for causing a computer that performs a learning process of a machine learning model that, in response to a first-class image as an image of a first dynamic range being input thereto, outputs a second-class image as an image of a second dynamic range into which the dynamic range of the first-class image has been widened, to perform a procedure for, on the basis of a second-class image, generating a first-class image associated with the second-class image, by referring to associative data where luminance values in the second dynamic range and luminance values in the first dynamic range are associated with each other, and a procedure for performing the learning process of the machine learning model by using the first-class image and the second-class image associated with the first-class image.

Furthermore, another program according to the present invention is a program for causing a computer to, by using a learned model and on the basis of a first-class moving image as a moving image of a first dynamic range, generate a second-class moving image as a moving image of a second dynamic range into which the dynamic range of the first-class moving image has been widened. The learned model is a learned model that, on the basis of a first-class frame image as a frame image included in the first-class moving image and a second-class frame image as a frame image of the second dynamic range of a frame adjacent to the first-class frame image, generates a second-class frame image associated with the first-class frame image. The program causes the computer to perform a procedure for executing a forward generation process that, by using the learned model and on the basis of a first-class frame image and a second-class frame image of a frame immediately before the first-class frame image, the second-class frame image being generated by the learned model, generates a second-class frame image associated with the first-class frame image, a procedure for executing a backward generation process that, by using the learned model, with respect to the first-class frame image of at least a first frame, and on the basis of a first-class frame image and a second-class frame image of a frame immediately after the first-class frame image, the second-class frame image being generated by the learned model, generates a second-class frame image associated with the first-class frame image, and a procedure for generating the second-class moving image on the basis of the second-class frame image generated by the forward generation process and the second-class frame image generated by the backward generation process.

DESCRIPTION OF EMBODIMENT

An embodiment of the present invention will be described in detail hereinbelow with reference to the drawings.

Figure 1:
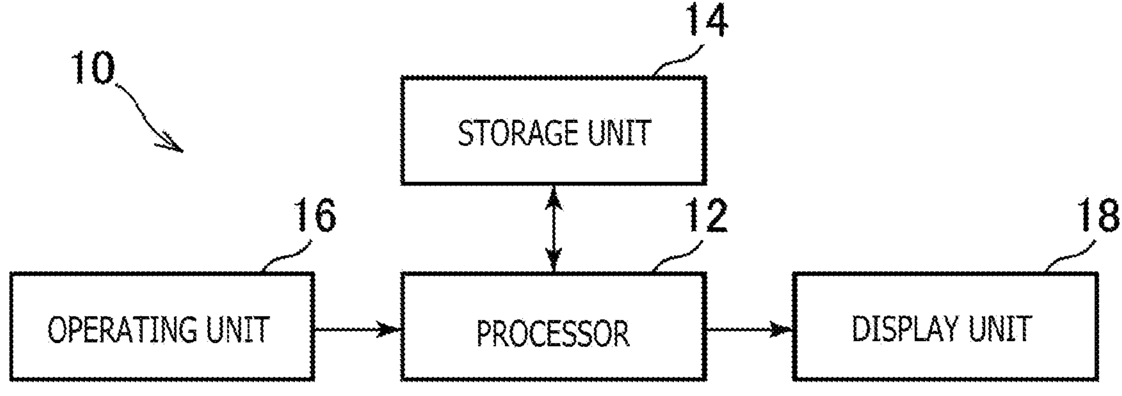
FIG. 1 is a diagram illustrating a configurational example of an image processing apparatus according to an embodiment of the present invention.

FIG. 1 is a diagram illustrating a configurational example of an image processing apparatus 10 according to the present embodiment. The image processing apparatus 10 according to the present embodiment is a computer such as a server computer, a personal computer, or a game console, for example. As illustrated in FIG. 1, the image processing apparatus 10 according to the present embodiment includes, for example, a processor 12, a storage unit 14, an operating unit 16, and a display unit 18.

The processor 12 is a program-controlled device such as a central processing unit (CPU) that operates according to programs installed in the image processing apparatus 10, for example.

The storage unit 14 is a storage device such as a read only memory (ROM) or a random access memory (RAM), a hard disk drive, a solid state drive, or the like. The storage unit 14 stores the programs to be executed by the processor 12, for example.

The operating unit 16 is a user interface such as a keyboard, a mouse, or a controller for use in a game console, and receives operating inputs from the user and outputs signals representing the contents of the operating inputs to the processor 12.

The display unit 18 is a display device such as a liquid crystal display, and displays various images according to commands from the processor 12.

In addition, the image processing apparatus 10 may include a communication interface such as a network board, an optical disk drive for reading optical disks such as digital versatile disc (DVD)-ROMs or Blu-ray (registered trademark) disks, a universal serial bus (USB) port, or the like.

The image processing apparatus 10 according to the present embodiment incorporates a machine learning model that has already learned. Further, the image processing apparatus 10 according to the present embodiment generates a moving image of an HDR on the basis of a moving image of an SDR by widening the dynamic range of the moving image of the SDR, with use of the machine learning model.

A moving image of the SDR will hereinafter be referred to as an "SDR moving image," and a moving image of the HDR as an "HDR moving image." Further, a frame image included in an SDR moving image will hereinafter be referred to as an "SDR frame image," and a frame image included in an HDR moving image as an "HDR frame image." Moreover, the color space of an SDR moving image according to the present embodiment is Rec709/r2.4, for example, and the color space of an HDR moving image according to the present embodiment is Rec2020/PQ, for example.

An example of a learning process of the machine learning model incorporated in the image processing apparatus 10 will be described hereinbelow.

Figure 2:
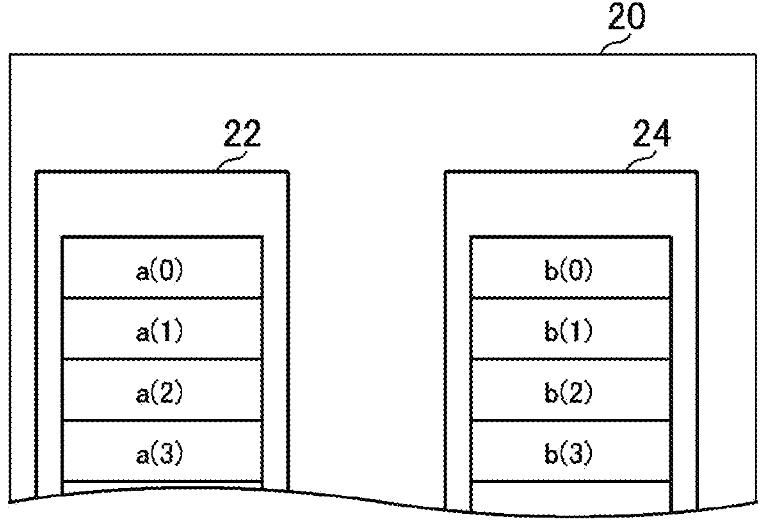
FIG. 2 is a diagram illustrating an example of a data structure of training data.

For the learning process of the machine learning model according to the present embodiment, first, training data 20 whose data structure is illustrated in FIG. 2 is generated on the basis of a given HDR moving image.

As illustrated in FIG. 2, the training data 20 according to the present embodiment includes a learning input SDR moving image 22 and a teacher HDR moving image 24. The learning input SDR moving image 22 is input to the machine learning model in the learning process of the machine learning model. Further, the teacher HDR moving image 24 is used as teacher data in the learning process of the machine learning model.

SDR frame images included in the learning input SDR moving image 22 will hereinafter be referred to as "SDR frame images a (a(0), a(1), a(2), a(3), . . . )." Note that the numerals in the parentheses represent frame numbers. For example, the SDR frame image a of a kth frame will be referred to as an "SDR frame image a(k−1)."

Further, HDR frame images included in the teacher HDR moving image 24 will be referred to as "HDR frame images b (b(0), b(1), b(2), b(3), . . . )." Note that the numerals in the parentheses represent frame numbers. For example, the HDR frame image a of a kth frame will be referred to as an "HDR frame image b(k−1)."

According to the present embodiment, for example, a learning input SDR moving image 22 that is associated with a given teacher HDR moving image 24 is generated on the basis of the given teacher HDR moving image 24 by referring to associative data where luminance values in the HDR and luminance values in the SDR are associated with each other. For example, the luminance values of pixels included in the HDR frame images b of a given teacher HDR moving image 24 are converted into luminance values in the SDR, and a learning input SDR moving image 22 associated with the given teacher HDR moving image 24 is generated by performing a color conversion using a 3×3 matrix.

Here, the teacher HDR moving image 24 may be a moving image representing one scene, for example. For example, each of moving images representing respective scenes divided from an HDR moving image such as a movie may be used as the teacher HDR moving image 24 on the basis of an edit decision list (EDL).

Further, the associative data according to the present embodiment may be a lookup table such as a one-dimensional lookup table (1D-LUT), for example. Moreover, the associative data may represent association between luminance values that have been processed in view of gamma correction.

Figure 3:
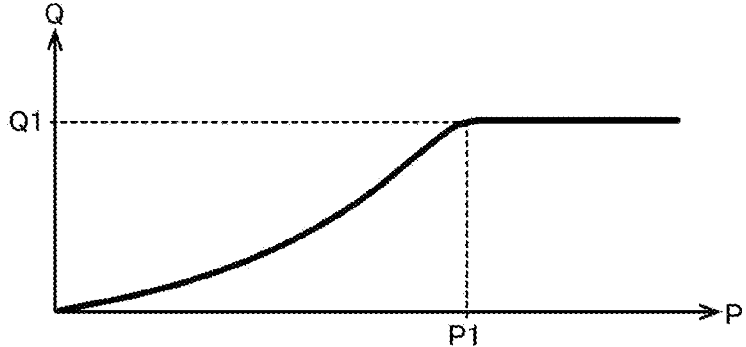
FIG. 3 is a diagram illustrating an example of association between luminance values in the HDR and luminance values in the SDR.

FIG. 3 is a diagram illustrating an example of association between luminance values P in the HDR and luminance values Q in the SDR, represented by the associative data according to the present embodiment. In the example of FIG. 2, the luminance values equal to or higher than a predetermined value P1 in the HDR are associated with a saturated value Q1 among the luminance values in the SDR. According to the present embodiment, consequently, there is generated an SDR moving image where the luminance values of all the pixels that are equal to or higher than P1 in the frame images of an HDR moving image are converted into the saturated value Q1.

According to the present embodiment, by referring to the above associative data with respect to each of a plurality of teacher HDR moving images 24, a learning input SDR moving image 22 is generated in association with the teacher HDR moving image 24. Note that the numbers of frames of the plurality of teacher HDR moving images 24 may be or may not be the same as each other.

Then, with respect to the plurality of teacher HDR moving images 24, there are generated a plurality of pieces of training data 20 including the teacher HDR moving images 24 and learning input SDR moving images 22 associated respectively with the teacher HDR moving images 24.

Further, according to the present embodiment, in order to enrich the number of pieces of the training data 20, there may be generated a moving image by backwardly reproducing a given teacher HDR moving image 24 (i.e., a moving image whose frames are arranged in an order reverse to that of the teacher HDR moving image 24), for example. Then, the moving image thus generated may be used as a teacher HDR moving image 24.

Moreover, a moving image made up of a moving image produced by forwardly reproducing a given teacher HDR moving image 24 and a moving image produced by backwardly reproducing the given teacher HDR moving image 24 may be generated, for example. In this case, a moving image whose frame number is twice as many as that of the given teacher HDR moving image 24 is generated. Then, the moving image thus generated may also be used as a teacher HDR moving image 24.

Figure 4:
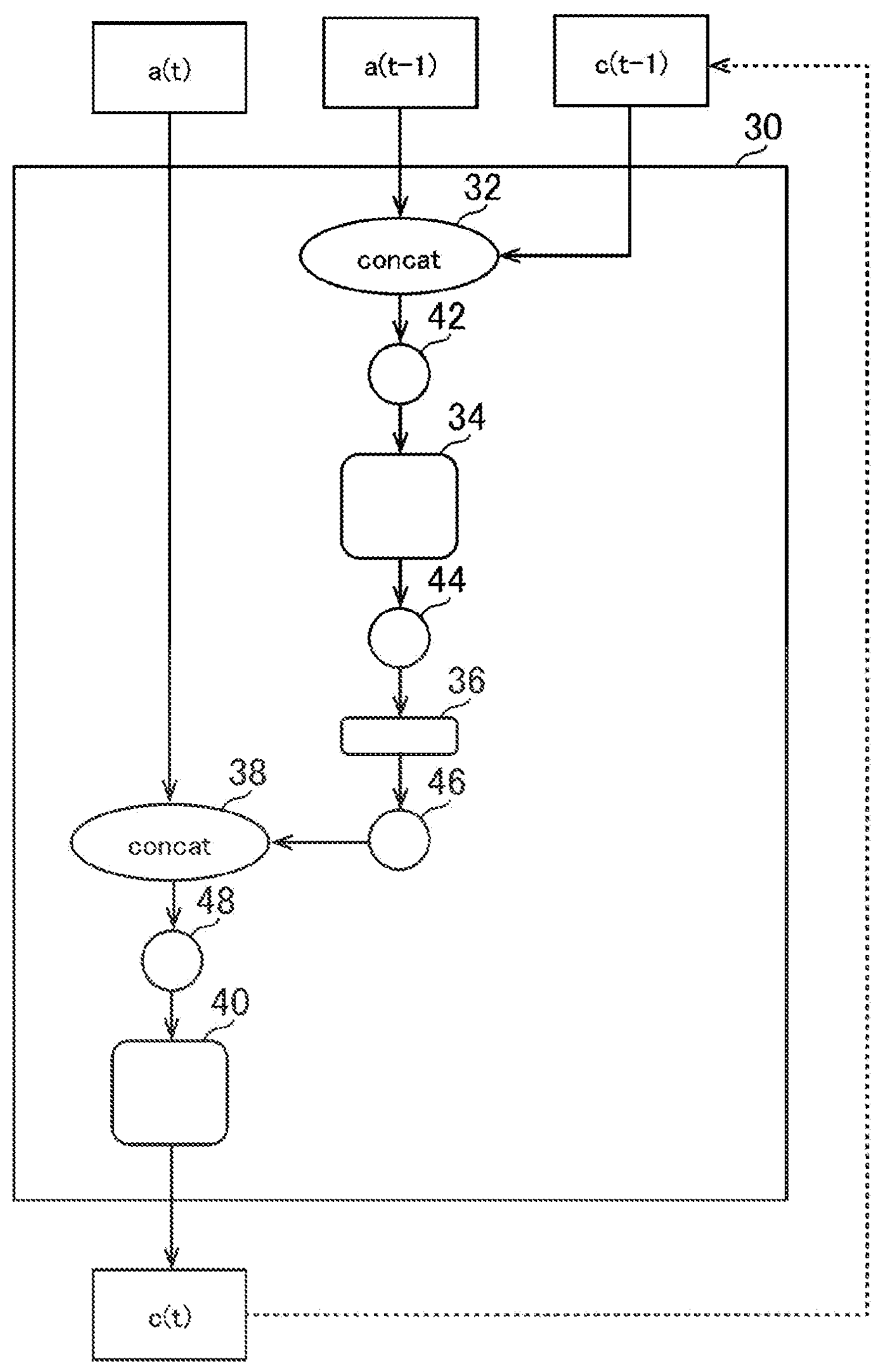
FIG. 4 is a diagram schematically illustrating an example of a learning process of a machine learning model.

Further, according to the present embodiment, the learning process of a machine learning model 30 illustrated in FIG. 4 is carried out with use of the plurality of pieces of training data 20 thus generated.

The machine learning model 30 according to the present embodiment is a deep neutral network (DNN) that incorporates therein the mechanism of a RNN. A plurality of inputs are successively applied to the machine learning model 30. Further, an output from the machine learning model 30 is added as part of next inputs to the machine learning model 30.

As illustrated in FIG. 4, the machine learning model 30 according to the present embodiment includes a first concatenate block 32, a feature extracting block 34, a size changing block 36, a second concatenate block 38, and an image generating block 40.

According to the present embodiment, the machine learning model 30 generates, with respect to each of the SDR frame images a included in the learning input SDR moving image 22, an HDR frame image associated with the SDR frame image a.

Figure 5:
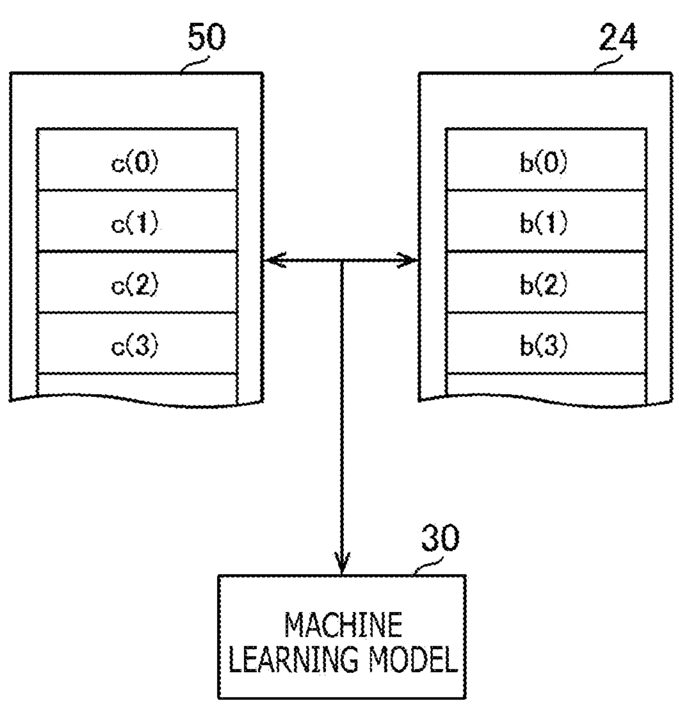
FIG. 5 is a diagram schematically illustrating an example of the learning process of the machine learning model.

As illustrated in FIGS. 4 and 5, in the learning process of the machine learning model 30, HDR frame images output from the machine learning model 30 will hereinafter be referred to as "HDR frame images c (c(0), c(1), c(2), c(3), . . . )." Note that the numerals in the parentheses represent frame numbers. For example, the HDR frame image c of a kth frame will be referred to as an "HDR frame image c(k−1)." Further, as illustrated in FIG. 5, an HDR moving image including the HDR frame images c thus generated will be referred to as a "reference HDR moving image 50."

For example, an HDR frame image c(t) included in the reference HDR moving image 50 is generated on the basis of an SDR frame image a(t) included in the learning input SDR moving image 22. Note that, according to the present embodiment, for example, the number of pixels in vertical columns and horizontal rows of the SDR frame images a and the number of pixels in vertical columns and horizontal rows of the HDR frame images c associated with the SDR frame images are the same as each other.

According to the present embodiment, for example, the SDR frame images a are successively input, to the machine learning model 30 in a normal order of frame numbers from the SDR frame image a(0) of the first frame.

Further, according to the present embodiment, for generating an HDR frame image c(t), not only an SDR frame image a(t) but also an SDR frame image a(t−1) of a frame immediately before the SDR frame image a(t) are input to the machine learning model 30. In addition, an HDR frame image c(t−1) that is an output in the frame immediately before the SDR frame image a(t) is also input to the machine learning model 30.

According to the present embodiment, for example, as illustrated in FIG. 4, the first concatenate block 32 generates first interim data 42 by concatenating the SDR frame image a(t−1) and the HDR frame image c(t−1). Then, the first interim data 42 is input to the feature extracting block 34.

The feature extracting block 34 is equivalent to a convolutional layer or a pooling layer of a CNN, for example. The feature extracting block 34 outputs a feature map 44 in response to the first interim data 42 being input thereto. The feature map 44 represents data equivalent to an image (map) output from the convolutional layer or the pooling layer, for example.

Then, the size changing block 36 generates an enlarged feature map 46 by enlarging the feature map 44 output from the feature extracting block 34, to the size (the number of pixels in vertical columns and horizontal rows) of the SDR frame image.

Subsequently, the second concatenate block 38 generates second interim data 48 by concatenating the SDR frame image a(t) and the enlarged feature map 46. Then, the second interim data 48 is input to the image generating block 40.

The image generating block 40 is a CNN, for example. The image generating block 40 outputs an HDR frame image c(t) in response to the second interim data 48 being input thereto. The HDR frame image c(t) is generated in such a manner. Further, as described above, the HDR frame image c(t) will be included in the inputs to the machine learning model 30 for generating an HDR frame image c(t+1) associated with an SDR frame image a(t+1).

Note that, according to the present embodiment, for generating an HDR frame image c(0), in addition to an SDR frame image a(0), an SDR frame image a(−1) as a dummy image and an HDR frame image c(−1) as a dummy image may be input to the machine learning model 30. Here, an image whose all pixels have identical luminance values may be used as the dummy image. For example, an image whose all pixels are white pixels or an image whose all pixels are black pixels may be used as the dummy image.

When the above process has been carried out on all the SDR frame images a and the reference HDR moving image 50 has been generated, an error (the result of comparison) between the reference HDR moving image 50 and the teacher HDR moving image 24 is specified, as illustrated in FIG. 5. Then, supervised learning for updating the values of parameters of the machine learning model 30 is carried out according to the error back propagation method in order to minimize the value of a loss function associated with the specified error. According to the present embodiment, for example, supervised learning using a known loss function aiming at time-series stability is carried out.

According to the present embodiment, for example, the process described above is carried out with respect to a plurality of pieces of training data 20 regarding moving images of various scenes, thereby performing the learning process of the machine learning model 30. In such a manner, the learned machine learning model 30 is generated.

Then, an HDR moving image is generated by widening the dynamic range of an SDR moving image from video resources in the past, for example, with use of the learned machine learning model 30 on which the learning process described above has been performed.

An example of the generation of an HDR moving image with use of the learned machine learning model 30 will be described below.

Figure 6:
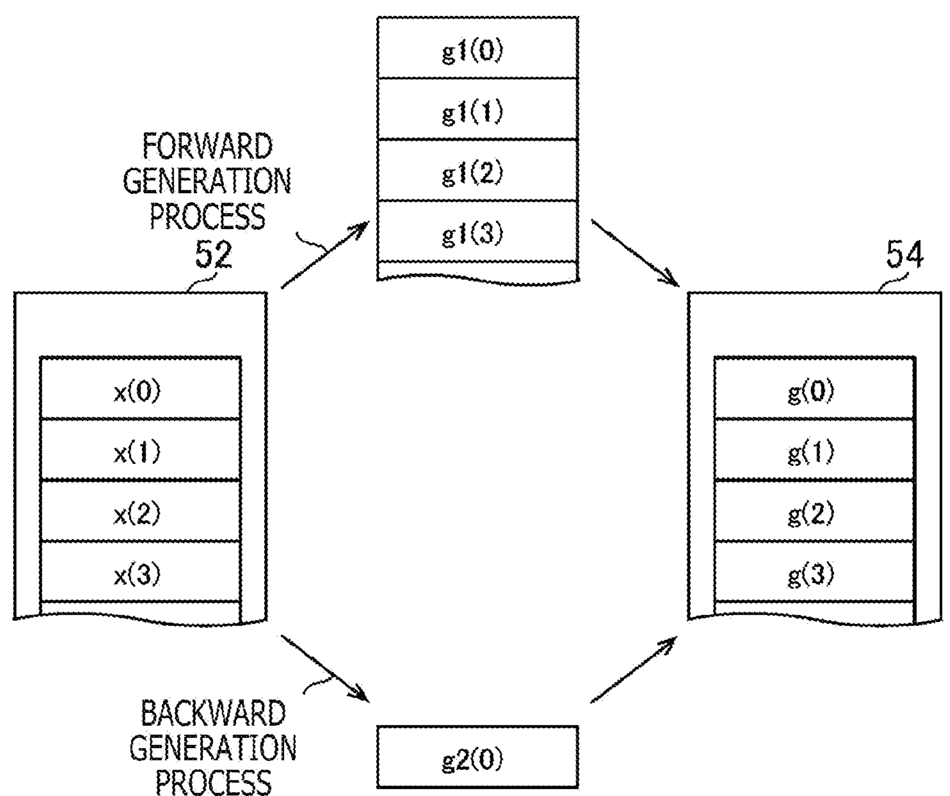
FIG. 6 is a diagram schematically illustrating an example of generation of a target HDR moving image.

As illustrated in FIG. 6, an SDR moving image from which to generate an HDR moving image will hereinafter be referred to as a "target SDR moving image 52." Further, an HDR moving image generated by widening the dynamic range of the target SDR moving image 52 into the HDR with use of the learned machine learning model 30 will hereinafter be referred to as a "target HDR moving image 54."

Moreover, SDR frame images included in the target SDR moving image 52 will be referred to as "SDR frame images x (x(0), x(1), x(2), x(3), . . . )." Note that the numerals in the parentheses represent frame numbers. For example, the SDR frame image x of a kth frame will be referred to as an "SDR frame image x(k−1)."

For generating the target HDR moving image 54 according to the present embodiment, two processes, i.e., a forward generation process and a backward generation process, are carried out.

HDR frame images generated by the forward generation process will hereinafter be referred to as "forward HDR frame images g1 (g1(0), g1(1), g1(2), g1(3), . . . )." Note that the numerals in the parentheses represent frame numbers. For example, the forward HDR frame image g1 of a kth frame will be referred to as a "forward HDR frame image g1(k−1)."

Further, HDR frame images generated by the backward generation process will be referred to as "backward HDR frame images g2." Note that, according to an example of the backward generation process to be described below, a backward HDR frame image g2 is generated only for the first frame. The backward HDR frame image g2 will be referred to as a "backward HDR frame image g2(0)."

Then, the target HDR moving image 54 is generated on the basis of the forward HDR frame image g1 and the backward HDR frame image g2.

HDR frame images included in the target HDR moving image 54 will hereinafter be referred to as "HDR frame images g (g(0), g(1), g(2), g(3), . . . )." Note that the numerals in the parentheses represent frame numbers. For example, the HDR frame image g of a kth frame will be referred to as an "HDR frame image g(k−1)."

In the forward generation process according to the present embodiment, the SDR frame images x are successively input, to the machine learning model 30 in a normal order of frame numbers from the SDR frame image x(0) of the first frame.

Figure 7:
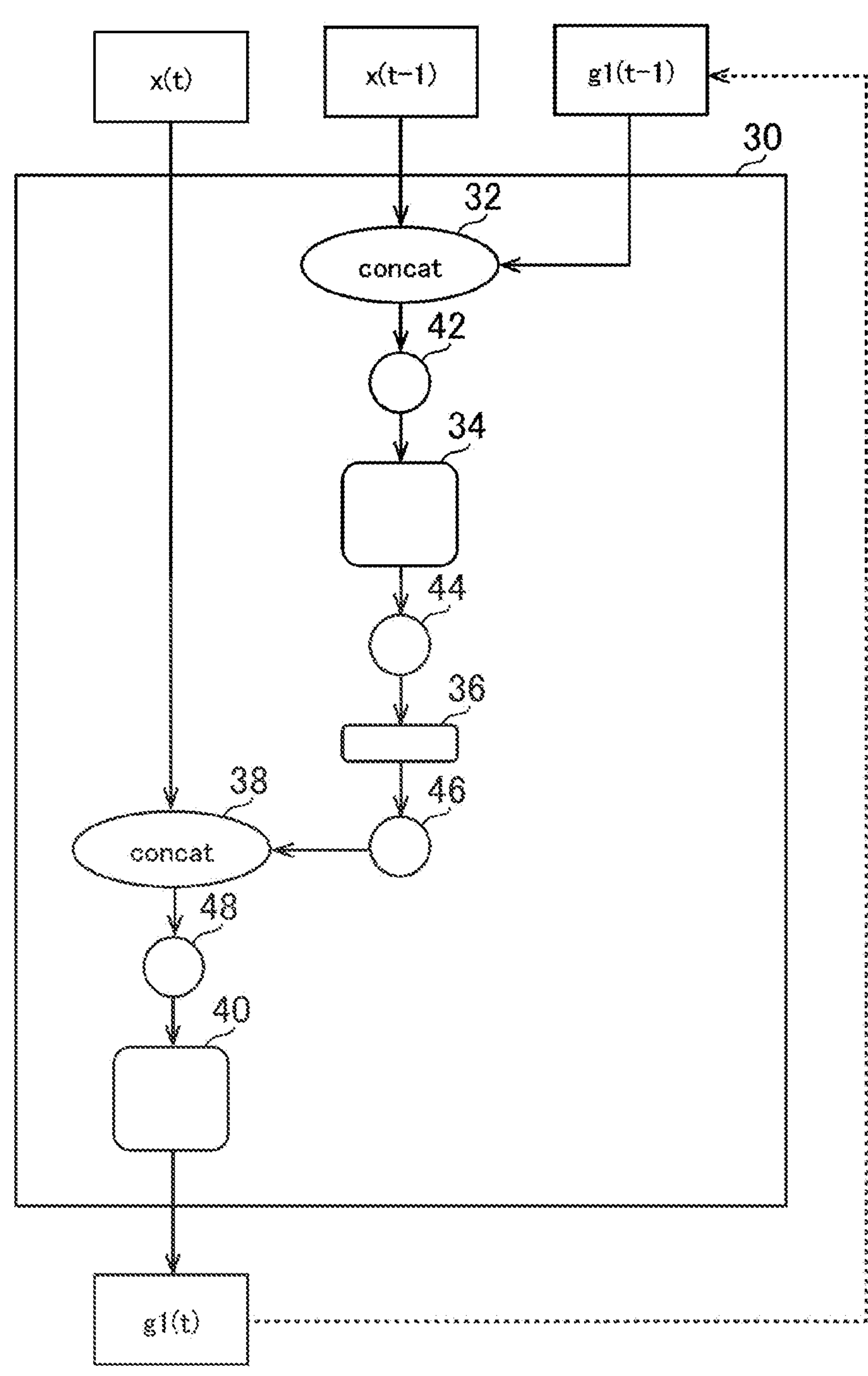
FIG. 7 is a diagram schematically illustrating an example of a forward generation process.

In the forward generation process, as illustrated in FIG. 7, for generating a forward HDR frame image g1(t), not only an SDR frame image x(t) but also an SDR frame image x(t−1) of a frame immediately before the SDR frame image x(t) are input to the machine learning model 30. In addition, a forward HDR frame image g1(t−1) that is an output in the frame immediately before the SDR frame image x(t) is also input to the machine learning model 30.

Then, the first concatenate block 32 generates first interim data 42 by concatenating the SDR frame image x(t−1) and the forward HDR frame image g1(t−1). Subsequently, the first interim data 42 is input to the feature extracting block 34.

Then, the same process as the learning process of the machine learning model 30 as described above is performed by the feature extracting block 34 and the size changing block 36, thereby generating an enlarged feature map 46.

Then, the second concatenate block 38 generates second interim data 48 by concatenating the SDR frame image x(t)

and the enlarged feature map 46. Subsequently, the second interim data 48 is input to the image generating block 40.

Then, the image generating block 40 outputs a forward HDR frame image g1(t) in response to the second interim data 48 being input thereto. The forward HDR frame image g1(t) is generated in such a manner.

Note that, according to the present embodiment, for generating a forward HDR frame image g1(0), in addition to an SDR frame image x(0), an SDR frame image x(−1) and a forward HDR frame image g1(−1) may be input as respective dummy images to the machine learning model 30. Here, an image whose all pixels have identical luminance values may be used as the dummy image. For example, an image whose all pixels are white pixels or an image whose all pixels are black pixels may be used as the dummy image.

According to the present embodiment, the above process is performed on all the SDR frame images x successively from the first frame, thereby generating a plurality of forward HDR frame images g1 (g1(0), g1(1), g1(2), g1(3), . . . ).

As described above, the forward generation process uses the dummy images for generating the forward HDR frame image g1(0) of the first frame. Therefore, the accuracy of prediction by the learned machine learning model 30 is lower for the forward HDR frame image g1(0) of the first frame than for the forward HDR frame images g1 of the other frames.

Figure 8:
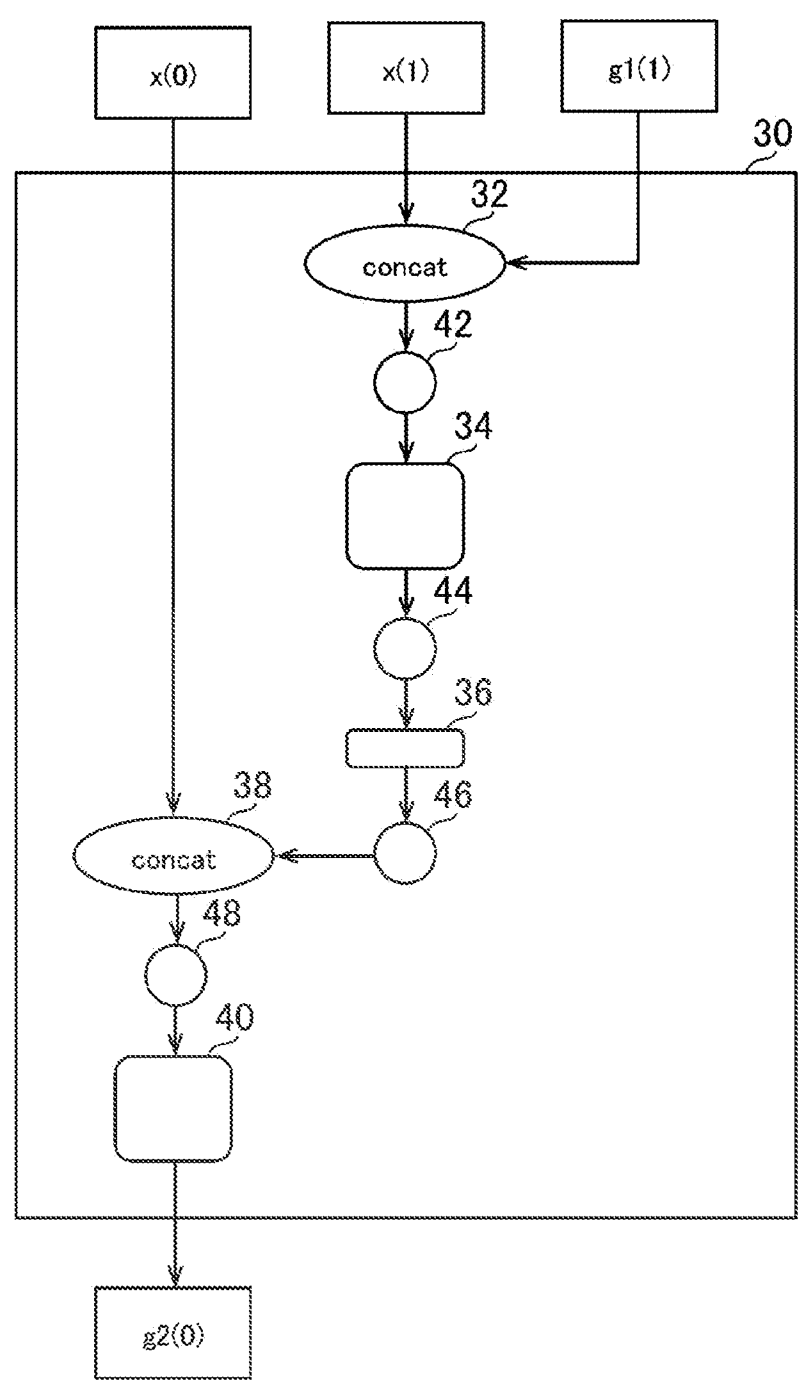
FIG. 8 is a diagram schematically illustrating an example of a backward generation process.

In view of the above drawback, according to the present embodiment, the backward generation process is carried out on the first frame, as illustrated in FIG. 8.

In the backward generation process, as illustrated in FIG. 8, not only the SDR frame image x(0) of the first frame included in the target SDR moving image 52 but also an SDR frame image x(1) of a second frame are input to the machine learning model 30. In addition, a forward HDR frame image g1(1) of a second frame is also input to the machine learning model 30. The forward HDR frame image g1(1) output from the machine learning model 30 by the forward generation process may thus be used as an input to the machine learning model 30 in the backward generation process.

Then, the first concatenate block 32 generates first interim data 42 by concatenating the SDR frame image x(1) and the forward HDR frame image g1(1). Subsequently, the first interim data 42 is input to the feature extracting block 34.

Then, a process similar to the training process of the machine learning model 30 as described above is performed by the feature extracting block 34 and the size changing block 36, thereby generating an enlarged feature map 46.

Subsequently, the second concatenate block 38 generates second interim data 48 by concatenating the SDR frame image x(0) and the enlarged feature map 46. Then, the second interim data 48 is input to the image generating block 40.

Subsequently, the image generating block 40 outputs a backward HDR frame image g2(0) in response to the second interim data 48 being input thereto. The backward HDR frame image g2(0) of the first frame is generated in such a manner.

Then, as described above, the target HDR moving image 54 is generated on the basis of the forward HDR frame image g1 generated by the forward generation process and the backward HDR frame image g2 generated by the backward generation process.

Here, for example, a target HDR moving image 54 where the backward HDR frame image g2(0) is included as an HDR frame image g(0) of the first frame may be generated. Further, with respect to another frame, a target HDR moving image 54 where the forward HDR frame image g1(t) is included as an HDR frame image g(t) of the other frame may be generated.

According to the present embodiment, as described above, the dynamic range of the first frame included in the generated target HDR moving image 54 can adequately be widened as well while the temporal consistency of the target HDR moving image 54 to be generated is maintained.

According to the present embodiment, further, different machine learning models are not used respectively for the forward generation process and the backward generation process, and the machine learning model 30 used for the forward generation process is also used for the backward generation process.

In terms of video image representation, the direction in which time flows may be forward or backward. Therefore, no problem arises out of the fact that the machine learning model 30 used for the forward generation process is also used for the backward generation process. In particular, when the machine learning model 30 has learned a moving image produced by backwardly reproducing a given HDR moving image, as described above, adequate HDR moving images are generated by either the forward generation process or the backward generation process using the common machine learning model 30.

According to the present embodiment, as described above, since there is no need to prepare separate machine learning models respectively for the forward generation process and the backward generation process, the learning process of the machine learning model 30 is less burdensome in the present embodiment.

Further, according to the present embodiment, the learning input SDR moving image 22 associated with the teacher HDR moving image 24 is generated by referring to the associative data. According to the present embodiment, therefore, the dynamic ranges of various images of the SDR can adequately be widened in a unified fashion.

The functions of the image processing apparatus 10 according to the present embodiment and the processes carried out by the image processing apparatus 10 according to the present embodiment will further be described below.

Figure 9:
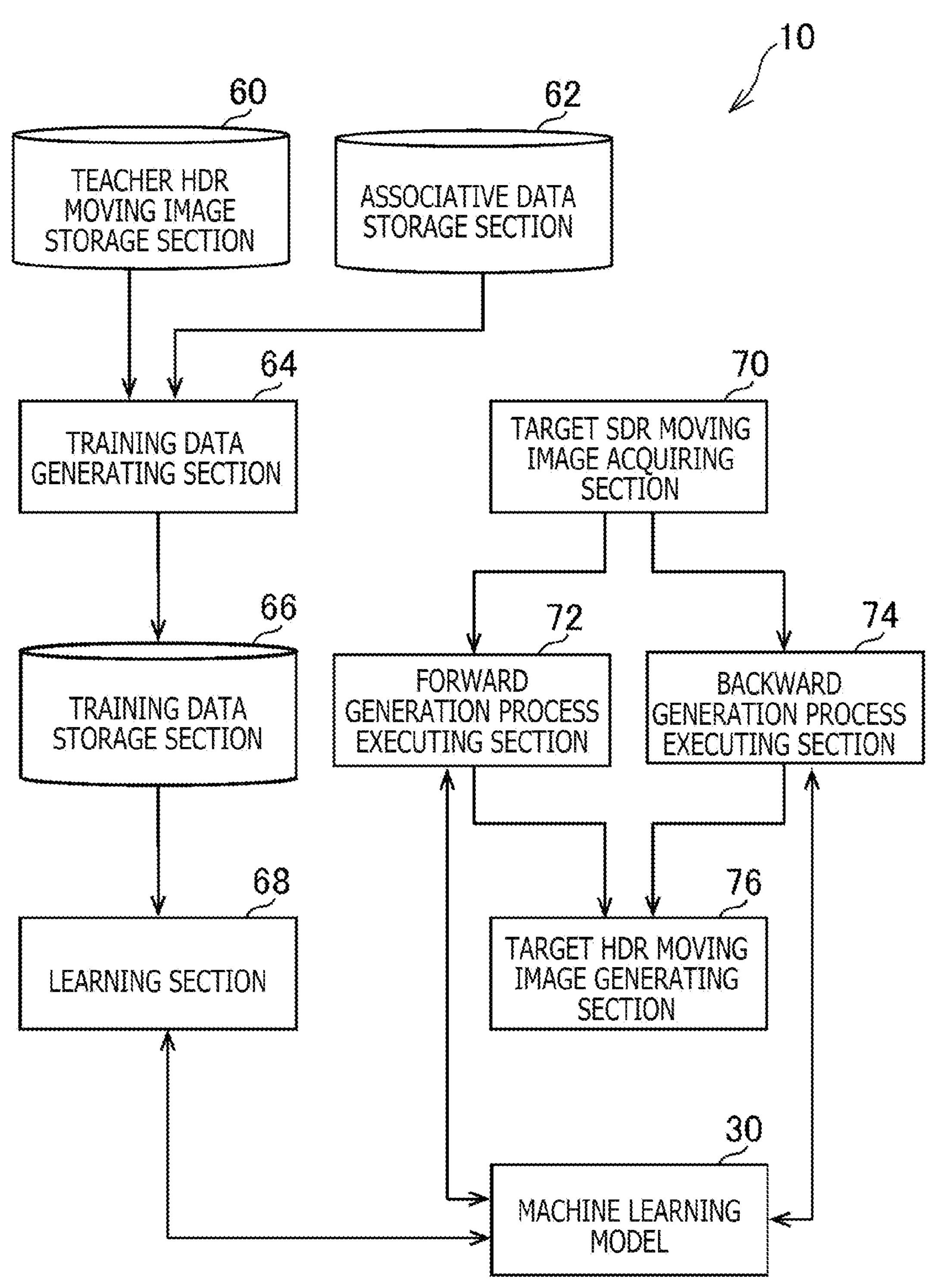
FIG. 9 is a functional block diagram illustrating an example of functions implemented in the image processing apparatus according to the embodiment of the present invention.

FIG. 9 is a functional block diagram illustrating an example of the functions implemented in the image processing apparatus 10 according to the present embodiment. Note that the image processing apparatus 10 according to the present embodiment does not need to implement all the functions illustrated in FIG. 9 and may further implement other functions than the functions illustrated in FIG. 9.

As illustrated in FIG. 9, the image processing apparatus 10 according to the present embodiment functionally includes, for example, a machine learning model 30, a teacher HDR moving image storage section 60, an associative data storage section 62, a training data generating section 64, a training data storage section 66, a learning section 68, a target SDR moving image acquiring section 70, a forward generation process executing section 72, a backward generation process executing section 74, and a target HDR moving image generating section 76.

The machine learning model 30 is implemented mainly in the processor 12 and the storage unit 14. The teacher HDR moving image storage section 60, the associative data storage section 62, and the training data storage section 66 are implemented mainly in the storage unit 14. The training data generating section 64, the learning section 68, the target SDR moving image acquiring section 70, the forward generation process executing section 72, the backward generation process executing section 74, and the target HDR moving image generating section 76 are implemented mainly in the processor 12.

The image processing apparatus 10 according to the present embodiment plays the role of a learning apparatus for carrying out the learning process of the machine learning model 30 that outputs an image of the HDR obtained by widening the dynamic range of an image of the SDR, in response to the image of the SDR being input thereto, and also the role of a moving image generating apparatus that generates an HDR moving image on the basis of an SDR moving image by widening the dynamic range of the SDR moving image into the HDR, with use of the learned machine learning model 30 (learned model). According to the example illustrated in FIG. 9, the machine learning model 30, the teacher HDR moving image storage section 60, the associative data storage section 62, the training data generating section 64, the training data storage section 66, and the learning section 68 correspond to the role of the learning apparatus. Further, the machine learning model 30, the target SDR moving image acquiring section 70, the forward generation process executing section 72, the backward generation process executing section 74, and the target HDR moving image generating section 76 correspond to the role of the moving image generating apparatus.

The foregoing functions may be implemented by executing, with the processor 12, programs that are installed in the image processing apparatus 10 as the computer and that include commands corresponding to the functions. The programs may be supplied to the processor 12 by way of a computer-readable information storage medium such as an optical disk, a magnetic disk, a magnetic tape, a magneto-optical disk, or a flash memory, or by way of the Internet, for example.

According to the present embodiment, for example, the machine learning model 30 is a machine learning model for generating an HDR frame image associated with an SDR frame image, on the basis of the SDR frame image and an HDR frame image of a frame adjacent to the SDR frame image. As with the machine learning model 30 described in the above example, the machine learning model 30 may be a machine learning model for generating an HDR frame image associated with an SDR frame image, on the basis of the SDR frame image, an SDR frame image of a frame adjacent to the SDR frame image, and an HDR frame image of the adjacent frame. Further, according to the present embodiment, for example, the machine learning model 30 is a machine learning model for outputting an image of the HDR produced by widening the dynamic range of an image of the SDR in response to the image of the SDR being input thereto.

Note that the machine learning model 30 may not be supplied with the SDR frame image a(t−1) illustrated in FIG. 4, the SDR frame image x(t−1) illustrated in FIG. 7, and the SDR frame image x(1) illustrated in FIG. 8, as inputs. In this case, the machine learning model 30 may not include the first concatenate block 32. Further, the feature extracting block 34 may be supplied with the HDR frame image c(t−1) illustrated in FIG. 4, the forward HDR frame image g1(t−1) illustrated in FIG. 7, and the forward HDR frame image g1(1) illustrated in FIG. 8, as inputs.

According to the present embodiment, for example, the teacher HDR moving image storage section 60 stores a plurality of teacher HDR moving images 24 described above.

According to the present embodiment, for example, the associative data storage section 62 stores associative data where luminance values in the HDR and luminance values in the SDR are associated with each other. As described above, the associative data may be a lookup table such as a one-dimensional lookup table.

Moreover, as illustrated in FIG. 3, the associative data may be data where the luminance values equal to or higher than the predetermined value P1 in the HDR are associated with the saturated value Q1 in the SDR.

According to the present embodiment, for example, the training data generating section 64 generates the training data 20 described above. The training data generating section 64 may generate an image of the SDR associated with an image of the HDR, on the basis of the image of the HDR, by referring to the associative data stored in the associative data storage section 62, for example. For example, the training data generating section 64 may generate a learning input SDR moving image 22 associated with a teacher HDR moving image 24, on the basis of the teacher HDR moving image 24, by referring to the associative data stored in the associative data storage section 62. Then, the training data generating section 64 may generate training data 20 including the teacher HDR moving image 24 and the learning input SDR moving image 22 associated with the teacher HDR moving image 24.

Subsequently, the training data generating section 64 may store a plurality of pieces of training data 20 associated respectively with a plurality of teacher HDR moving images 24, in the training data storage section 66.

According to the present embodiment, for example, the training data storage section 66 stores the plurality of pieces of training data 20 generated by the training data generating section 64.

According to the present embodiment, for example, the learning section 68 performs the learning process of the machine learning model 30 by using an image of the SDR and an image of the HDR associated with the image of the SDR. For example, as described above, the learning section 68 may perform the learning process of the machine learning model 30 by using a learning input SDR moving image 22 included in training data 20 and a teacher HDR moving image 24 included in the training data 20. Further, the learning section 68 may also perform the learning process of the machine learning model 30 by using a reference HDR moving image 50 generated on the basis of a learning input SDR moving image 22 included in training data 20 and a teacher HDR moving image 24 included in the training data 20.

According to the present embodiment, for example, the target SDR moving image acquiring section 70 acquires the above target SDR moving image 52 as an SDR moving image to be input to the machine learning model 30 that has learned (learned model).

According to the present embodiment, for example, by using the learned machine learning model 30, the forward generation process executing section 72 executes the forward generation process for generating an HDR frame image associated with an SDR frame image on the basis of the SDR frame image and an HDR frame image of a frame immediately before the SDR frame image, the HDR frame image being generated by the machine learning model 30.

For example, the forward generation process executing section 72 generates a forward HDR frame image g1(t) on the basis of an SDR frame image x(t) and a forward HDR frame image g1(t−1) by using the learned machine learning model 30.

As described above, the forward generation process executing section 72 may generate a forward HDR frame image g1(t) on the basis of an SDR frame image x(t), an SDR frame image x(t−1), and a forward HDR frame image g1(t−1) by using the learned machine learning model 30. Note that the SDR frame image x(t−1) may not be included in the inputs to the learned machine learning model 30.

Moreover, the forward generation process executing section 72 may not generate forward HDR frame images g1 with respect to the SDR frame images x of all the frames.

According to the present embodiment, for example, by using the learned machine learning model 30 and with respect to an SDR frame image of at least a first frame, the backward generation process executing section 74 executes the backward generation process for generating an HDR frame image associated with the SDR frame image on the basis of the SDR frame image and an HDR frame image of a frame immediately after the SDR frame image, the HDR frame image being generated by the machine learning model 30.

For example, the backward generation process executing section 74 generates a backward HDR frame image g2(0) on the basis of an SDR frame image x(0) and a forward HDR frame image g1(1) by using the learned machine learning model 30.

For example, as described above, the backward generation process executing section 74 may generate a backward HDR frame image g2(0) associated with an SDR frame image x(0), on the basis of the SDR frame image x(0), an SDR frame image x(1), and a forward HDR frame image g1(1), by using the learned machine learning model 30. Note that the SDR frame image x(1) may not be included in the inputs to the learned machine learning model 30.

According to the present embodiment, for example, the target HDR moving image generating section 76 generates a target HDR moving image 54 on the basis of a forward HDR frame image g1 generated by the forward generation process and a backward HDR frame image g2 generated by the backward generation process. As described above, the target HDR moving image generating section 76 may generate an HDR moving image including a backward HDR frame image g2 of a first frame generated by the backward generation process and forward HDR frame images g1 of second and subsequent frames generated by the forward generation process.

Figure 10:
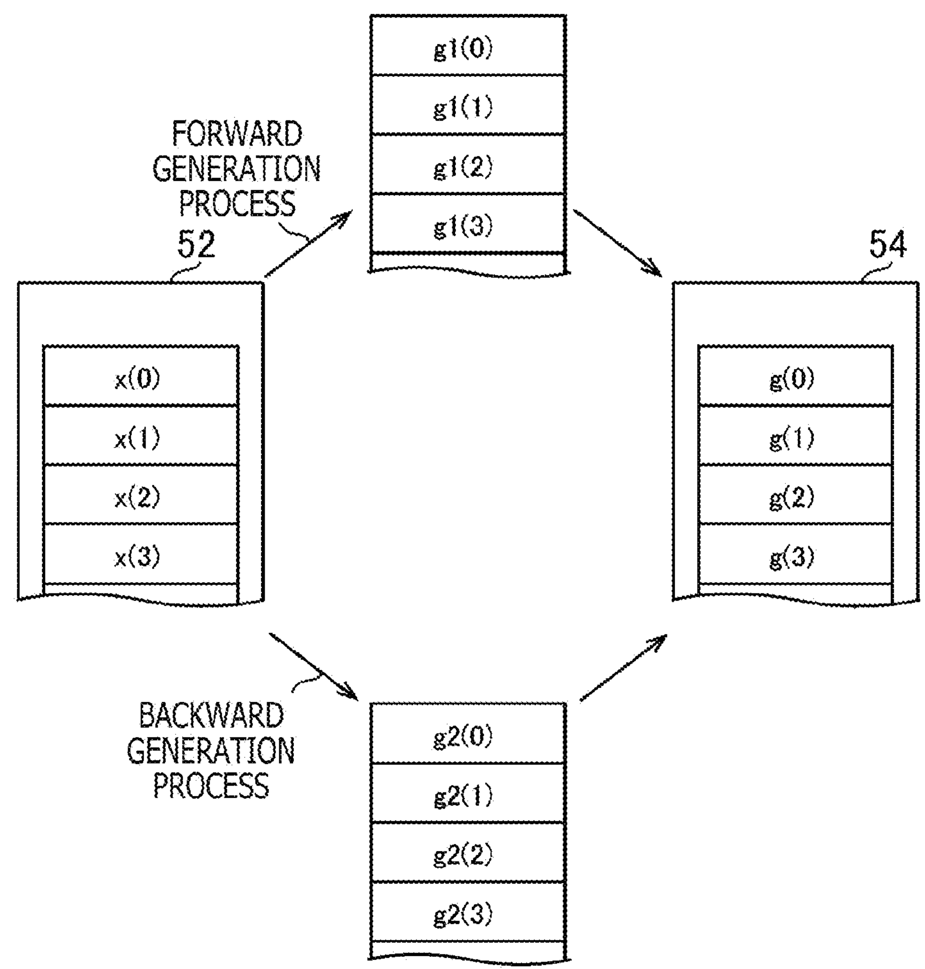
FIG. 10 is a diagram schematically illustrating an example of the generation of a target HDR moving image.

Further, according to the present embodiment, as illustrated in FIG. 10, the backward generation process executing section 74 may generate backward HDR frame images g2 of other frames than the first frame. For example, the backward generation process executing section 74 may generate backward HDR frame images g2 (g2(0), g2(1), g2(3), . . . ) of all the frames. Note that the numerals in the parentheses represent frame numbers. For example, the backward HDR frame image g2 of a kth frame will be referred to as a "backward HDR frame image g2(k−1)."

Moreover, the backward generation process executing section 74 may generate an HDR frame image associated with an SDR frame image, on the basis of the SDR frame image and an HDR frame image of a frame immediately after the SDR frame image, the HDR frame image being generated by the backward generation process.

Here, for example, in an order reverse to that of the frame numbers from an SDR frame image x (denoted as x(N)) of a final frame, SDR frame images x may successively be input to the machine learning model 30.

Figure 11:
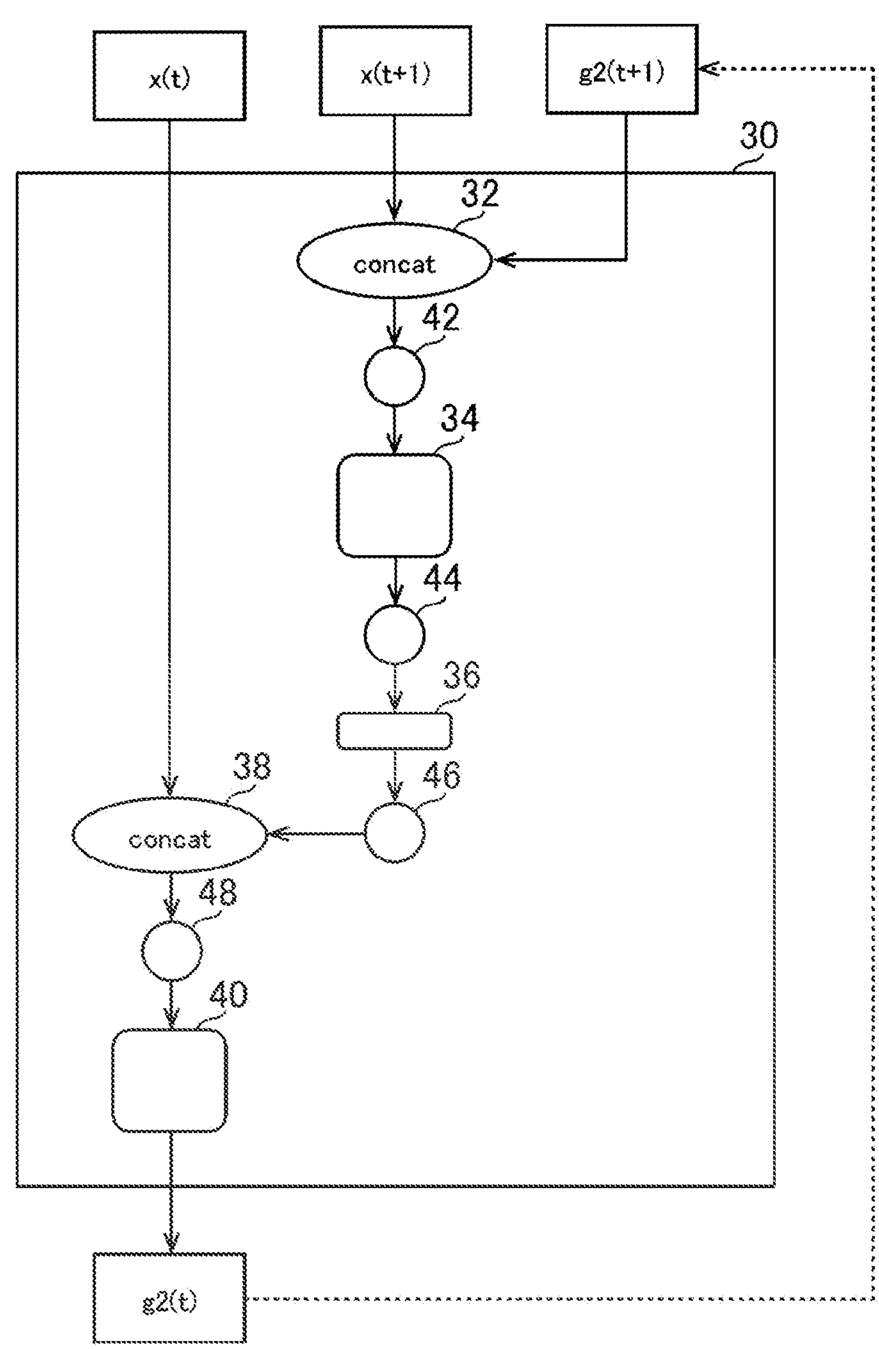
FIG. 11 is a diagram schematically illustrating an example of the backward generation process.

For example, as illustrated in FIG. 11, in the backward generation process, not only an SDR frame image x(t) included in the target SDR moving image 52 but also an SDR frame image x(t+1) may be input to the machine learning model 30. Further, a backward HDR frame image g2(t+1) that is an output in a frame immediately before the SDR frame image x(t) may also be input to the machine learning model 30. In such a manner, the backward HDR frame image g2(t+1) output from the machine learning model 30 by the backward generation process may be used as an input to the machine learning model 30 in the backward generation process.

Then, the first concatenate block 32 may generate first interim data 42 by concatenating the SDR frame image x(t+1) and the backward HDR frame image g2(t+1). Subsequently, the first interim data 42 may be input to the feature extracting block 34.

Then, a process similar to the learning process of the machine learning model 30 as described above may be performed by the feature extracting block 34 and the size changing block 36, thereby generating an enlarged feature map 46.

Then, the second concatenate block 38 may generate second interim data 48 by concatenating the SDR frame image x(t) and the enlarged feature map 46. Subsequently, the second interim data 48 may be input to the image generating block 40.

Then, the image generating block 40 may output a backward HDR frame image g2(t) in response to the second interim data 48 being input thereto. The backward HDR frame image g2(t) may be generated in such a manner.

In this case, for generating a backward HDR frame image g2 (denoted as g2(N)) of a final frame (first backward generation process), in addition to an SDR frame image x(N), an SDR frame image x(N+1) as a dummy image and a backward HDR frame image g2(N+1) as a dummy image may be input to the machine learning model 30. Here, an image whose all pixels have identical luminance values may be used as the dummy image. For example, an image whose all pixels are white pixels or an image whose all pixels are black pixels may be used as the dummy image.

Note that the SDR frame image x(t+1) may not be included in the inputs to the learned machine learning model 30.

Further, according to the present embodiment, the target HDR moving image generating section 76 may generate an HDR frame image g(t) included in the target HDR moving image 54, on the basis of the forward HDR frame image g1(t) and the backward HDR frame image g2(t), with respect to at least one frame.

For example, the target HDR moving image generating section 76 may generate, with respect to at least one frame, a target HDR moving image 54 where the weighted mean of the luminance values of pixels included in the forward HDR frame image g1(t) and the luminance values of the pixels included in the backward HDR frame image g2(t) is set to the luminance values of the pixels included in the HDR frame image g(t).

For example, the weighted mean where the luminance values of pixels included in the forward HDR frame image g1(t) and the luminance values of the pixels included in the backward HDR frame image g2(t) are weighted by a predetermined weight (e.g., 2:1) may be set to the luminance values of the pixels included in the HDR frame image g(t).

Moreover, weighting may be performed such that the smaller the frame number is, the larger the weight of the luminance values of the backward HDR frame image g2(t) becomes, and the larger the frame number is, the larger the weight of the luminance values of the forward HDR frame image g1(t) becomes. Note that, in this case, the weight of the luminance values of the forward HDR frame image g1(t)

may be zero for the first frame. In addition, the weight of the luminance values of the backward HDR frame image g2(t) may be zero for the final frame.

Figure 12:
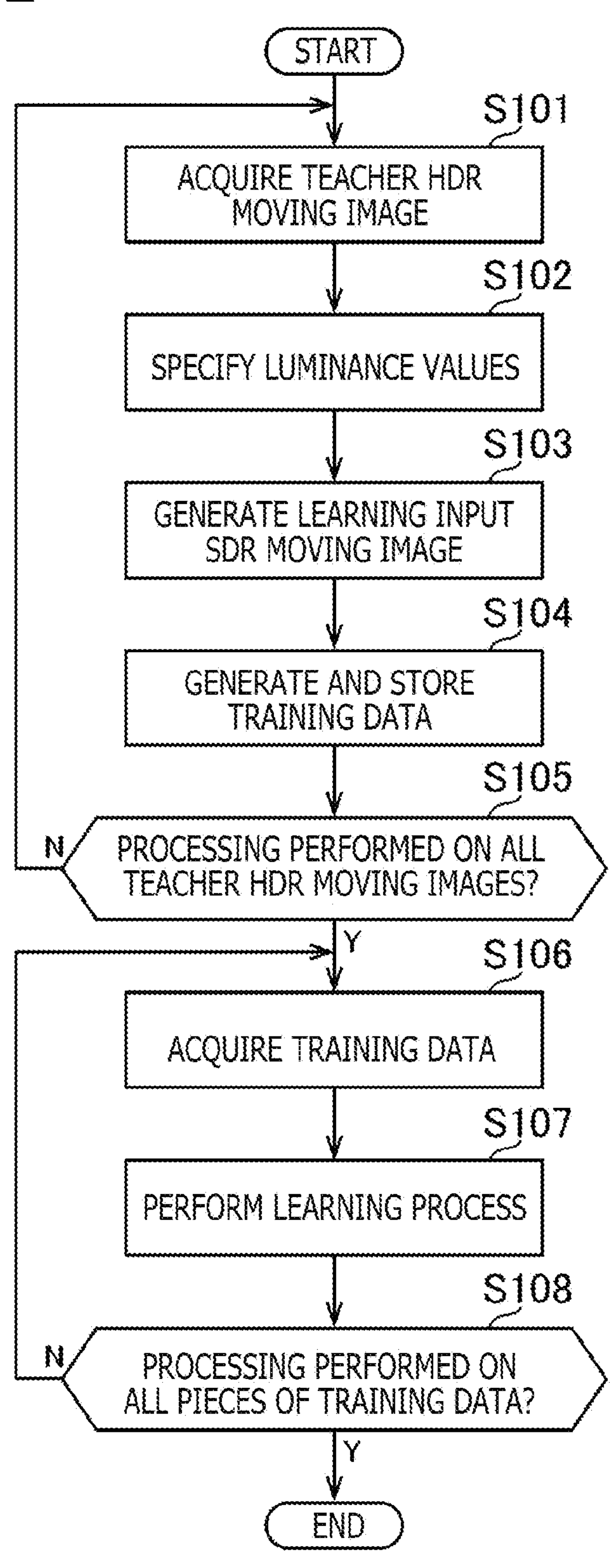
FIG. 12 is a flowchart illustrating an example of a processing sequence carried out by the image processing apparatus according to the embodiment of the present invention.

An example of the sequence of a learning process carried out by the image processing apparatus 10 according to the present embodiment will be described hereinbelow with reference to the flowchart illustrated in FIG. 12. Note that, according to the present processing example, it is assumed that a plurality of given teacher HDR moving images 24 are stored in advance in the teacher HDR moving image storage section 60.

First, the training data generating section 64 acquires one of the teacher HDR moving images 24 on which the processing indicated by S102 through S104 has not yet been performed (S101).

Then, the training data generating section 64 specifies the luminance values in the SDR of the respective pixels included in the HDR frame images b of the teacher HDR moving image 24 acquired by the processing indicated by S101, by referring to the associative data stored in the associative data storage section 62 (S102).

Subsequently, the training data generating section 64 generates a learning input SDR moving image 22 on the basis of the luminance values specified by the processing indicated by S102 (S103).

Then, the training data generating section 64 generates training data 20 including the learning input SDR moving image 22 generated by the processing indicated by S103 and the teacher HDR moving image 24 acquired by the processing indicated by S101. Subsequently, the training data generating section 64 stores the training data 20 in the training data storage section 66 (S104).

Then, the training data generating section 64 confirms whether or not the processing indicated by S101 through S104 has been performed on all the teacher HDR moving images 24 stored in the teacher HDR moving image storage section 60 (S105).

In a case where it is confirmed that the processing indicated by S101 through S104 has not been performed on all the teacher HDR moving images 24 (S105: N), control goes back to the processing indicated by S101.

In a case where it is confirmed that the processing indicated by S101 through S104 has been performed on all the teacher HDR moving images 24 (S105: Y), the learning section 68 acquires one piece of training data 20 on which the processing indicated by S107 has not yet been performed (S106).

Then, the learning section 68 performs the learning process of the machine learning model 30 by using the training data 20 acquired by the processing indicated by S106 (S107).

Subsequently, the learning section 68 confirms whether or not the processing indicated by S107 has been performed on all the pieces of training data 20 stored in the training data storage section 66 (S108).

In a case where it is confirmed that the processing indicated by S107 has not been performed on all the pieces of training data 20 (S107: N), control goes back to the processing indicated by S106.

In a case where it is confirmed that the processing indicated by S107 has been performed on all pieces of the training data 20 (S107: Y), the processing sequence of the present processing example is ended.

Figure 13:
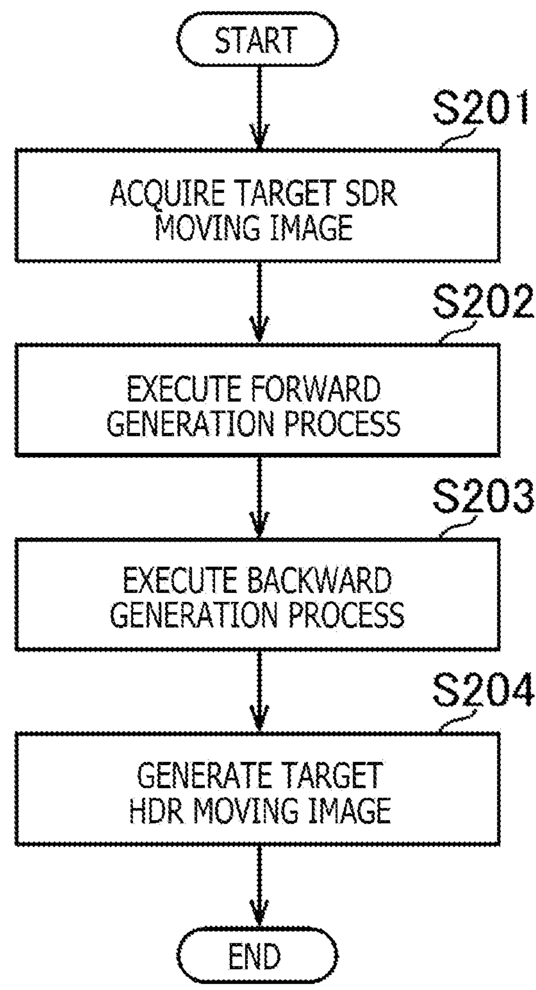
FIG. 13 is a flowchart illustrating an example of a processing sequence carried out by the image processing apparatus according to the embodiment of the present invention.

An example of the sequence of a generation process for generating a target HDR moving image 54 carried out by the image processing apparatus 10 according to the present embodiment will be described hereinbelow with reference to the flowchart illustrated in FIG. 13.

First, the target SDR moving image acquiring section 70 acquires a target SDR moving image 52 (S201).

Then, the forward generation process executing section 72 executes the forward generation process on the target SDR moving image 52 acquired by the processing indicated by S201, thereby generating a forward HDR frame image g1 with respect to at least one frame (S202).

Subsequently, the backward generation process executing section 74 executes the backward generation process on the target SDR moving image 52 acquired by the processing indicated by S201, thereby generating a backward HDR frame image g2 with respect to at least a first frame (S203).

Then, the target HDR moving image generating section 76 generates a target HDR moving image 54 on the basis of the forward HDR frame image g1 generated by the processing indicated by S202 and the backward HDR frame image g2 generated by the processing indicated by S203 (S204). Subsequently, the processing sequence of the present processing example is ended.

Note that the present invention is not limited to the above embodiment.

For example, the scope of application of the present invention is not limited to the SDR and the HDR.

For example, the present invention is generally applicable to an image processing apparatus 10 that performs the learning process of a machine learning model 30 that, in response to a first-class image as an image of a first dynamic range (not limited to the SDR) being input thereto, outputs a second-class image as an image of a second dynamic range (not limited to the HDR) into which the dynamic range of the first-class image has been widened.

In this case, the associative data storage section 62 may store associative data where luminance values in the second dynamic range and luminance values in the first dynamic range are associated with each other. Here, the associative data may be data where luminance values equal to or higher than a predetermined value in the second dynamic range are associated with a saturated value in the first dynamic range. Further, the associative data may be a lookup table such as a one-dimensional lookup table.

Then, the training data generating section 64 may generate a first-class image associated with a second-class image, on the basis of the second-class image, by referring to the associative data.

Subsequently, the learning section 68 may perform the learning process of the machine learning model 30 by using the first-class image and the second-class image that is associated with the first-class image.

Moreover, the present invention is generally applicable to an image processing apparatus 10 that, by using the learned machine learning model 30 (learned model) and on the basis of a first-class moving image as a moving image of a first dynamic range (not limited to the SDR), generates a second-class moving image as a moving image of a second dynamic range (not limited to the HDR) into which the dynamic range of the first-class moving image has been widened.

In this case, the learned machine learning model 30 may be a machine learning model that, on the basis of a first-class frame image as a frame image included in a first-class moving image and a second-class frame image as a frame image of the second dynamic range adjacent to the first-class frame image, generates a second-class frame image associated with the first-class frame image.

Then, the forward generation process executing section 72 may execute a forward generation process that, by using the learned machine learning model 30 and on the basis of a first-class frame image and a second-class frame image immediately before the first-class frame image, the second-class frame image being generated by the machine learning model 30, generates a second-class frame image associated with the first-class frame image.

Subsequently, the backward generation process executing section 74 may execute a backward generation process that, by using the learned machine learning model 30, with respect to a first-class frame image of at least a first frame, and on the basis of the first-class frame image and a second-class frame image immediately after the first-class frame image, the second-class frame image being generated by the machine learning model 30, generates a second-class frame image associated with the first-class frame image.

Here, the backward generation process executing section 74 may, on the basis of a first-class frame image and a second-class frame image immediately after the first-class frame image, the second-class frame image being generated by the forward generation process, generate a second-class frame image associated with the first-class frame image.

Alternatively, the backward generation process executing section 74 may, on the basis of a first-class frame image and a second-class frame image of a frame immediately after the first-class frame image, the second-class frame image being generated by the backward generation process, generate a second-class frame image associated with the first-class frame image.

Then, the target HDR moving image generating section 76 may generate a second-class moving image on the basis of a second-class frame image generated by the forward generation process and a second-class frame image generated by the backward generation process.

Further, the learned machine learning model 30 may be a machine learning model that, on the basis of a first-class frame image, a first-class frame image of a frame adjacent to the first-class frame image, and a second-class frame image of the adjacent frame, generates a second-class frame image associated with the first-class frame image.

In this case, the forward generation process executing section 72 may, on the basis of a first-class frame image, a first-class frame image of a frame immediately before the first-class frame image, and a second-class frame image of the frame immediately before the first-class frame image, the second-class frame image being generated by the machine learning model 30, generate a second-class frame image associated with the first-class frame image.

Then, the backward generation process executing section 74 may, on the basis of a first-class frame image, a first-class frame image of a frame immediately after the first-class frame image, and a second-class frame image of the frame immediately after the first-class frame image, the second-class frame image being generated by the machine learning model 30, generate a second-class frame image associated with the first-class frame image.

Further, the target HDR moving image generating section 76 may generate a second-class moving image including a second-class frame image of a first frame generated by the backward generation process and second-class frame images of second and subsequent frames generated by the forward generation process.

Alternatively, the target HDR moving image generating section 76 may, with respect to at least one frame, on the basis of a second-class frame image of the frame generated by the forward generation process and a second-class frame image of the frame generated by the backward generation process, generate a frame image of the frame included in a second-class moving image.

In this case, the target HDR moving image generating section 76 may, with respect to at least one frame, generate a second-class moving image where the weighted mean of the luminance values of pixels included in a second-class frame image of the frame generated by the forward generation process and the luminance values of the pixels included in a second-class frame image of the frame generated by the backward generation process is set to the luminance values of the pixels included in the frame image of the frame.

Moreover, for example, on the basis of a still image of the HDR, a still image of the SDR associated with the still image of the HDR may be generated by referring to the associative data. Further, the machine learning model 30 may not incorporate the functions of the RNN therein. Then, the learning process of the machine learning model 30 may be carried out with use of the still image of the HDR and the still image of the SDR.

Moreover, for example, the image processing apparatus 10 may not include the functions of a learning apparatus that performs the learning process of the machine learning model 30 that outputs images of the HDR in response to images of the SDR being input thereto. In addition, the image processing apparatus 10 may not include the functions of a moving image generating apparatus that, by using the learned machine learning model 30 (learned model) and on the basis of an SDR moving image, generates an HDR moving image where the dynamic range of the SDR moving image has been widened into the HDR.

Further, the specific character strings and numerical values described above and the specific character strings and numerical values illustrated in the drawings are by way of example only, and the present invention is not limited to those character strings and numerical values.

The invention claimed is:

1. A moving image generating apparatus comprising:

a processor; and a storage unit storing programs executable by the processor to perform operations comprising:

generating, based on a first-class video of a first dynamic range, a second-class video, the second-class video being a version of the first-class video with a second dynamic range into which the first dynamic range has been widened, wherein the generating the second-class video comprises:

executing a forward generation process that, by using a learned model and on a basis of a first-class frame image that is a frame of the first-class video and a second-class frame image of a frame immediately before the first-class frame image, generates a second-class frame image of the first-class frame image, the second-class frame image of the frame immediately before the first-class frame image being generated by the learned model;

executing a backward generation process that, by using the learned model and on a basis of the first-class frame image and a second-class frame image of a frame immediately after the first-class frame image, generates a second-class frame image of the first-class frame image, the second-class frame image of the frame immediately after the first-class video being generated by the learned model; and generating the second-class video using the second-class frame image generated by the forward generation process and the second-class frame image generated by the backward generation process.

2. The moving image generating apparatus according to claim 1, wherein the operations further comprise:

executing another forward generation process that generates, on a basis of the first-class frame image, a first-class frame image of the frame immediately before the first-class frame image, and the second-class frame image of the frame immediately before the first-class frame image, another second-class frame image of the first-class frame image; and executing another backward generation process that generates, on a basis of the first-class frame image, a first-class frame image of the frame immediately after the first-class frame image, and the second-class frame image of the frame immediately after the first-class frame image, another second-class frame image of the first-class frame image.

3. The moving image generating apparatus according to claim 1, wherein the operations further comprise generating, on a basis of the first-class frame image and the second-class frame image generated by the forward generation process, another second-class frame image associated with the first-class frame image.

4. The moving image generating apparatus according to claim 1, wherein the operations further comprise generating, on a basis of the first-class frame image and the second-class frame image generated by the backward generation process, another second-class frame image associated with the first-class frame image.

5. The moving image generating apparatus according to claim 1, wherein the second-class video includes the second-class frame image generated by the backward generation process and additional second-class frame images generated by the forward generation process for additional frames of the first-class video.

6. The moving image generating apparatus according to claim 1, wherein the operations further comprise generating, with respect to at least one additional frame of the first-class video and on a basis of a second-class frame image of the at least one additional frame generated by the forward generation process and a second-class frame image of the at least one additional frame generated by the backward generation process, a frame image included in the second-class video.

7. The moving image generating apparatus according to claim 6, wherein the second-class video is generated where a weighted mean of luminance values of pixels included in the second-class frame image of the at least one additional frame generated by the forward generation process and luminance values of the pixels included in the second-class frame image of the at least one additional frame generated by the backward generation process is set to luminance values of the pixels included in the at least one additional frame.

8. The moving image generating apparatus according to claim 1, wherein the first dynamic range is a standard dynamic range, and the second dynamic range is a high dynamic range.

9. A moving image generating method comprising:

generating, based on a first-class video of a first dynamic range, a second-class video, the second-class video being a version of the first-class video with a second dynamic range into which the first dynamic range has been widened, wherein the generating the second-class video comprises:

executing a forward generation process that, by using a learned model and on a basis of a first-class frame image that is a frame of the first-class video and a second-class frame image of a frame immediately before the first-class frame image, generates a second-class frame image of the first-class frame image, the second-class frame image of the frame immediately before the first-class frame image being generated by the learned model;

executing a backward generation process that, by using the learned model and on a basis of the first-class frame image and a second-class frame image of a frame immediately after the first-class frame image, generates a second-class frame image of the first-class frame image, the second-class frame image of the frame immediately after the first-class frame image being generated by the learned model; and generating the second-class video using the second-class frame image generated by the forward generation process and the second-class frame image generated by the backward generation process.

10. A non-transitory, computer-readable storage medium containing a computer program, which when executed by a computer causes the computer to carry out actions comprising:

generating, based on a first-class video of a first dynamic range, a second-class video, the second-class video being a version of the first-class video with a second dynamic range into which the first dynamic range has been widened, wherein the generating the second-class video comprises:

executing a forward generation process that, by using a learned model and on a basis of a first-class frame image that is a frame of the first-class video and a second-class frame image of a frame immediately before the first-class frame image, generates a second-class frame image of the first-class frame image, the second-class frame image of the frame immediately before the first-class frame image being generated by the learned model;

executing a backward generation process that, by using the learned model and on a basis of the first-class frame image and a second-class frame image of a frame immediately after the first-class frame image, generates a second-class frame image of the first-class frame image, the second-class frame image of the frame immediately after the first-class frame image being generated by the learned model; and generating the second-class video using the second-class frame image generated by the forward generation process and the second-class frame image generated by the backward generation process.

11. The moving image generating method according to claim 9, further comprising:

executing another forward generation process that generates, on a basis of the first-class frame image, a first-class frame image of the frame immediately before the first-class frame image, and the second-class frame image of the frame immediately before the first-class frame image, another second-class frame image of the first-class frame image; and executing another backward generation process that generates, on a basis of the first-class frame image, a first-class frame image of the frame immediately after the first-class frame image, and the second-class frame image of the frame immediately after the first-class frame image, another second-class frame image of the first-class frame image.

12. The moving image generating method according to claim 9, further comprising generating, on a basis of the first-class frame image and the second-class frame image generated by the forward generation process, another second-class frame image associated with the first-class frame image.

13. The moving image generating method according to claim 9, further comprising generating, on a basis of the first-class frame image and the second-class frame image generated by the backward generation process, another second-class frame image associated with the first-class frame image.

14. The moving image generating method according to claim 9, wherein the second-class video includes the second-class frame image generated by the backward generation process and additional second-class frame images generated by the forward generation process for additional frames of the first-class video.

15. The moving image generating method according to claim 9, further comprising generating, with respect to at least one additional frame of the first-class video and on a basis of a second-class frame image of the at least one additional frame generated by the forward generation process and a second-class frame image of the at least one additional frame generated by the backward generation process, a frame image included in the second-class video.

16. The moving image generating method according to claim 15, wherein the second-class video is generated where a weighted mean of luminance values of pixels included in the second-class frame image of the at least one additional frame generated by the forward generation process and luminance values of the pixels included in the second-class frame image of the at least one additional frame generated by the backward generation process is set to luminance values of the pixels included in the at least one additional frame.

17. The moving image generating method according to claim 9, wherein the first dynamic range is a standard dynamic range, and the second dynamic range is a high dynamic range.

18. The non-transitory, computer-readable storage medium according to claim 10, wherein the actions further comprise:

executing another forward generation process that generates, on a basis of the first-class frame image, a first-class frame image of the frame immediately before the first-class frame image, and the second-class frame image of the frame immediately before the first-class frame image, another second-class frame image of the first-class frame image; and executing another backward generation process that generates, on a basis of the first-class frame image, a first-class frame image of the frame immediately after the first-class frame image, and the second-class frame image of the frame immediately after the first-class frame image, another second-class frame image of the first-class frame image.

19. The non-transitory, computer-readable storage medium according to claim 10, wherein the actions further comprise generating, on a basis of the first-class frame image and the second-class frame image generated by the forward generation process, another second-class frame image associated with the first-class frame image.

20. The non-transitory, computer-readable storage medium according to claim 10, wherein the actions further comprise generating, on a basis of the first-class frame image and the second-class frame image generated by the backward generation process, another second-class frame image associated with the first-class frame image.

* * * * *